July 22, 1969
E. A. SCORDATO
3,456,895
CLOTH ROLL DISC BRAKE CONSTRUCTION FOR CLOTH LAYING
MACHINE CARRIAGES
Filed Jan. 17, 1968
2 Sheets-Sheet 1
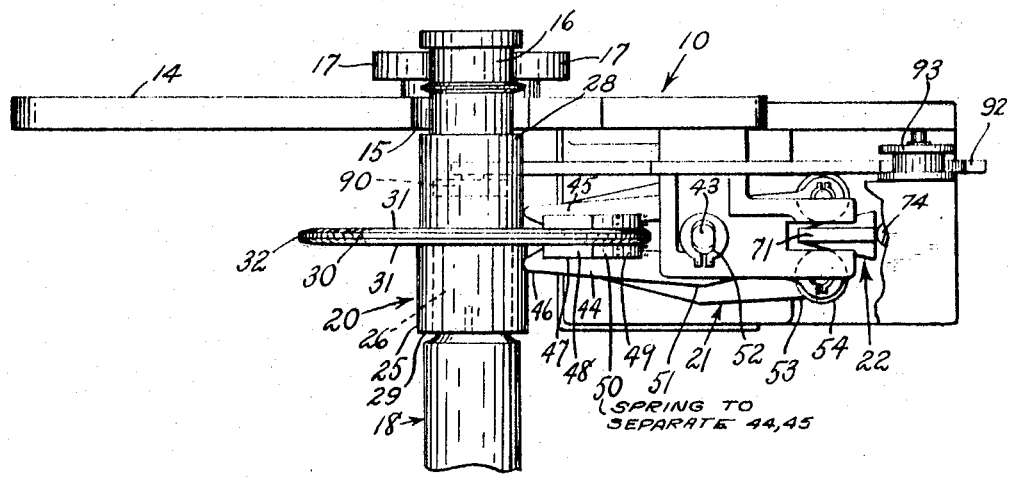
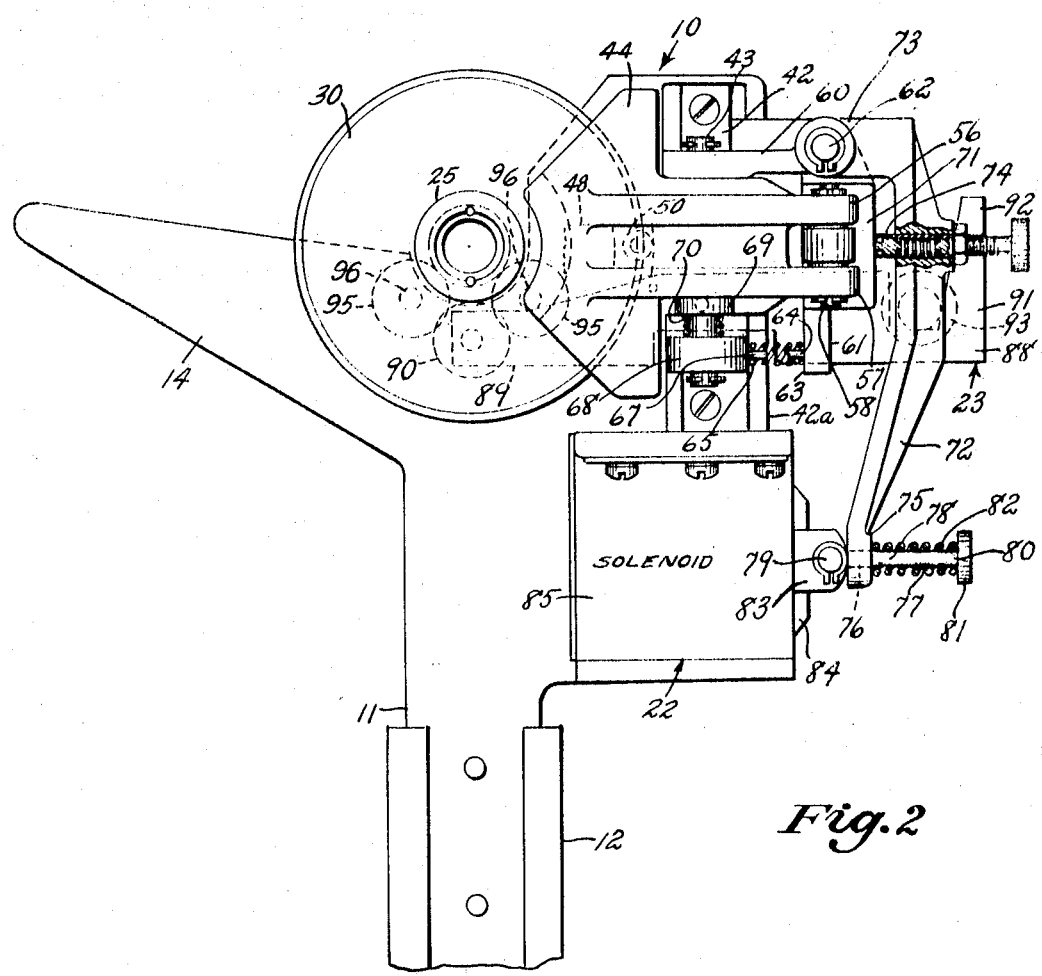

United States Patent Office 3,456,895
Patented July 22, 1969

3,456,895
CLOTH ROLL DISC BRAKE CONSTRUCTION FOR CLOTH LAYING MACHINE CARRIAGES
Emil A. Scordato, Bronxville, N.Y., assignor to Cutting Room Appliances Corp., New York, N.Y., a corporation of New York
Filed Jan. 17, 1968, Ser. No. 698,510
Int. Cl. B65h 23/08, 77/00
U.S. Cl. 242—75.46                     6 Claims

ABSTRACT OF THE DISCLOSURE

A disc brake controlling rotational motion of a cloth roll spindle selectively supported upon a cloth laying machine carriage, said brake including caliper type braking members which are resiliently urged apart, selectively, to either of two positions, in a first position of which the calipers are clear of engagement with the disc, and in a second position of which they are substantially spread apart further to facilitate the insertion of a spindle having a braking disc radially mounted thereupon therebetween.

---

This invention relates generally to the field of cloth laying machines of a type adapted to spread a continuous web of cloth over a cloth laying table, and more particularly to an improved braking means for controlling rotation of the cloth roll supply spindle mounted upon the reciprocating carriage element.

It is known in the art to provide such braking means, including both hand operated types, and those which employ a dancer roller or bar to sense the presence or absence of slack in the web of cloth emanating from the cloth roll. Such means have included brake shoes or strap means which bear directly upon the outer surface of the cloth roll spindle, which, being of relatively narrow diameter affords little exposed surface area upon which the brake shoes may bear.

Caliper type disc brakes, per se, have been widely used in other arts where the disc is mounted upon a rotating part which is in more or less fixed axial position with respect to the shoes. Thus the necessity of repositioning a disc between brake shoes with each replacement of a cloth roll, which often weighs several pounds, has prevented wide spread use of disc brakes in the cloth laying field.

It is, therefore, among the principal objects of the present invention to provide an improved disc braking mechanism particularly suited for use in conjunction with a cloth laying carriage.

Another object of the invention lies in the provision of an improved disc brake means of the class described in which the calipers include means for spreading the braking surfaces thereof to a degree sufficiently wide to permit ready positioning of a disc mounted upon a cloth laying spindle therebetween.

A further object of the invention lies in the provision of disc brake means which may be electrically operated, thereby eliminating unnecessary mechanical linkages between the usual sensing point along the web of material, and the brake mechanism itself.

Yet another object of the invention lies in the provision of improved disc braking means which can be conveniently incorporated into existing cloth laying machine carriages, without extensive modification.

A further object of the invention lies in the provision of improved disc brake means for cloth laying machines in which the cost of manufacture may be of a reasonably low order, with consequent wide sale, distribution and use.

A feature of the disclosed embodiment lies in the provision of an electrical solenoid for operating the calipers, including resilient linkage means therebetween, whereby the desired degree of braking force may be conveniently adjusted, and maintained independently of the position of the solenoid armature with respect to its winding.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIGURE 1 is a fragmentary top plan view of an embodiment of the invention.

FIGURE 2 is a fragmentary side elevational view thereof.

Figure 3:
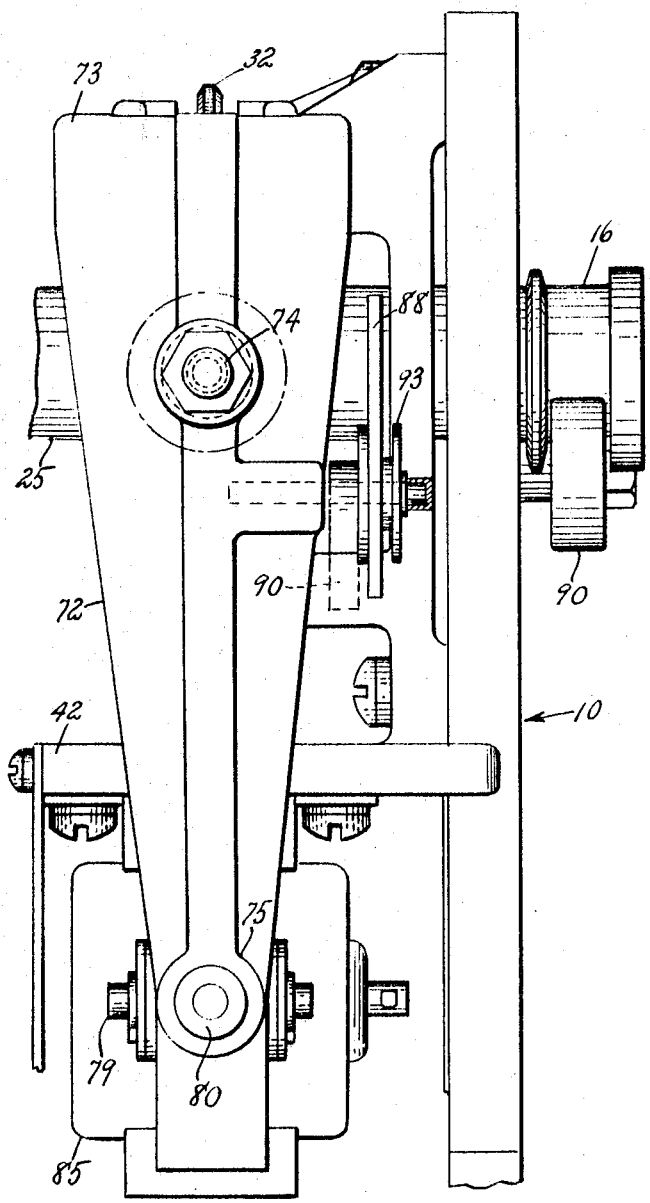
FIGURE 3 is a fragmentary side elevational view as seen from the right hand portion of FIGURE 2.

In accordance with the invention, the device, generally indicated by reference character 10, is illustrated in operative relation upon a cloth laying machine carriage having a pair of cloth roll supporting uprights, one of which is indicated by reference character 11. The lower ends 12 thereof are connected to the carriage, and the upper ends 13 thereof are formed to include guiding arms 14 terminating in a spindle engaging notch 15 adapted to support a bearing surface 16 of a cloth roll spindle upon friction reducing rollers, two of which are indicated by reference character 17.

The device 10 includes broadly: a disc element 20, a caliper element 21, caliper actuating means 22, and caliper control means 23.

The disc element 20 is adapted to be mounted upon a cloth roll spindle (generally indicated by reference character 18), and includes a sleeve member 25 forming an internal axially disposed bore 26 engageable with the outer surface 16. Positioned medially between first and second ends 28 and 29, respectively, is a radially extending disc member 30 bounded by planar surfaces 31 and a tapered periphery 32. As best seen in FIGURE 1, the sleeve member 25 is located on the spindle 18 so that when the spindle is positioned upon the cloth laying carriage in proper relation, the disc will be in position to be engaged by the caliper element 21.

The caliper element 21 includes a base member 40 mounted on an inner surface of the supporting upright 11, and in turn mounting an upper bearing member 42 and a lower bearing member 42a aligning between them a vertically supported pintle 43. First and second caliper members 44 and 45, respectively, are pivotally engaged upon the pintle 43 for mutually opposite rotational movement.

The calipers 44 and 45 are substantially similar, each including a first end 46 having a recess 47 enclosing a brake pad 48 and a second recess 49 engaging one end of a coil spring 50. A central portion 51 defines a loose fitting bore 52 engaging the pintle 43, and a second end 53 is provided with a roller member 54 on a pintle 55 supported between upper and lower brackets 56 and 57, respectively on a pintle 58.

The caliper actuating means 22 is mounted upon an upper laterally extending bracket 60, and includes a vertically suspended pivotally mounted lever 61 rotating about the axis of a pintle 62 at the upper end thereof. The lower end 63 includes a stud 64 engaging one end of a coil spring 65, the opposite end engaging a corresponding stud 67 on an annular member 68 surrounding the lower end of the pintle 43. A vertically oriented spring 70 cooperates with a retaining member 69 to position the member 68 as shown in FIGURE 2. The lever 61 also mounts a wedge type cam member 71 which serves to close the caliper members 44 and 45 upon the disc member 30.

Mounted on the same pintle 62 is a cam actuating lever 72 for rotation about the upper terminal 73 thereof. Mounted below the terminal 73 is an adjustable resilient cam engaging member 74, and a lower terminal 75 is provided with a bore 76 penetrated by a pintle 77, one end 78 of which is anchored for rotation about the axis of a transverse pintle 79, and an outer end 80 of which is provided with an adjusting nut 81 which bears upon one end of a compression spring 82, the opposite end bearing upon the outer surface of the lower terminal 75. The pin 79 is positioned within a block 83 on the end of an armature 84 of a solenoid 85. From a consideration of FIGURE 2, it will be apparent that the braking force applied to the caliper element may be adjusted within the limits of the elastic modulus of the spring 82, and irrespective of the desired force, the solenoid 85 may be operated so that the armature 84 lies either in extended or contracted position without chattering upon contraction.

The caliper element control means 23 serves to permit the caliper members 44 and 45 to be spread apart to a relatively wide degree under the influence of the spring 50 at the time the spindle 18 is positioned for operation, and to limit this movement to that necessary to just clear the surfaces 31 when the cloth laying machine is in operation. This mechanism thus permits the elimination of wasted movement during the period in which the brake will be applied and released a relatively large number of times over a relatively short period, and yet permit the caliper members to be spread sufficiently far apart to permit convenient loading by merely placing the spindle in engagement with the arms 14 and allowing the spindle to roll downwardly thereupon into engagement with the notches 15. This is accomplished by means of a pivotally mounted lever 88, a first end 89 of which s provided with a roller 90 resiliently disposed by spring 65 in the area enclosed by one notch 15, so as to be moved therefrom upon engagement of the spindle within the notch. Rollers 95 are fixed, for rotation only about shafts 96. A second end 91 includes a laterally offset portion 92 positioned upon such occurrence to engage a roller 93 on the lever 72, and limit its outward movement to that necessary to permit the calipers to disengage the disc. Thus, upon loading, the calipers will normally be widely distended by the spring 50, and upon engagement of the spindle 18 within the notches 15, the gap will automatically be diminished to operating limits as the lever 88 pivots. Adjustment of member 74 permits the placing of a constant drag on the disk, independently of the braking force.

I wish it to be understood that I do not consider the invention limited to the precise details of structure shown and set forth in this specification, for obvious modifications will occur to those skilled in the art to which the invention pertains.

I claim:

1. Cloth roll braking means for use in conjunction with a cloth laying machine carriage comprising: supporting means mounted on said carriage for supporting a roll of cloth for rotation about a fixed axis, cloth roll spindle means engageable with said supporting means, said spindle including a brake disc radially extending therefrom adjacent one end thereof, a brake caliper element including a pair of caliper members supported for movement of at least one of said caliper members with respect to the other upon said carriage, and having braking surfaces disposed on either side of said disc member, when said spindle is positioned upon said supporting means.

2. Structure in accordance with claim 1, including resilient means disposed between said caliper members for moving said braking surfaces in mutually opposite directions to clear said disc, and means selectively limiting the effect of said resilient means to either of two positions, in a first position of which said braking surfaces are spaced a distance apart sufficient to clear corresponding surfaces on said disc, and in a second position of which said braking surfaces are spaced apart a greater distance to facilitate the insertion of said disc therebetween.

3. Structure in accordance with claim 2, said last mentioned limiting means including means resiliently lying in the path of said spindle upon the positionng thereof upon said supporting means, to detect the presence thereof and to respond thereto.

4. Structure in accordance with claim 1 including means for bringing said caliper members to bear upon said disc, said means including a pivotally mounted cam member, a pivotally mounted lever having a path of travel passing through said cam member, solenoid means for imparting movement to said lever, and resilient means interconnecting said solenoid means and said lever.

5. Structure in accordance with claim 4, said selectively limiting means including a pivotally mounted lever having first and second ends, a first end of which selectively engages said spindle upon the positioning thereof upon said carriage element, and a second end of which correspondingly engages means communicating with said pivotally mounted cam.

6. Structure in accordance with claim 1 including means for placing a constant drag on said spindle when the same is engaged between said calipers, independently of the application of a braking force.

References Cited

UNITED STATES PATENTS

| 2,285,939 | 6/1942 | Neumair | 242—75.46 |
| 3,310,254 | 3/1967 | Merrill | 242—75.4 |
| 3,404,850 | 10/1968 | Merrill | 242—75.4 |

NATHAN L. MINTZ, Primary Examiner